United States Patent
Schmitz et al.

[19]

[11] Patent Number: 6,060,796
[45] Date of Patent: May 9, 2000

[54] PROTECTIVE CIRCUIT

[75] Inventors: Frank Schmitz, Bergisch-Gladbach; Christoph Klees, Wiehl, both of Germany

[73] Assignee: Schneider Electric SA, Boulogne Billancourt, France

[21] Appl. No.: 09/091,418

[22] PCT Filed: Apr. 1, 1997

[86] PCT No.: PCT/EP97/01641

§ 371 Date: Jun. 24, 1998

§ 102(e) Date: Jun. 24, 1998

[87] PCT Pub. No.: WO97/37168

PCT Pub. Date: Oct. 9, 1997

[30] Foreign Application Priority Data

Apr. 2, 1996 [DE] Germany .......................... 196 13 206
Apr. 19, 1996 [DE] Germany .......................... 196 15 588

[51] Int. Cl.[7] .................................................. H03K 5/153
[52] U.S. Cl. .......................... 307/326; 361/179; 361/189; 324/512; 324/756
[58] Field of Search .................................... 307/326, 112, 307/116, 125; 324/512, 519, 522, 527, 528, 756, 609, 610, 661, 725; 361/170, 93, 23, 33, 31, 179, 189

[56] References Cited

U.S. PATENT DOCUMENTS 3,947,734  3/1976  Fyler ...................................... 317/146
4,631,722  12/1986  Voss .......................................... 371/9
4,661,880  4/1987  Futsuhara ................................. 361/93
5,081,406  1/1992  Hughes et al. ......................... 318/478
5,345,138  9/1994  Mukaidono et al. .................... 307/326

FOREIGN PATENT DOCUMENTS 0 105 054 B1   4/1984   European Pat. Off. .

*Primary Examiner*—Jeffrey Gaffin
*Assistant Examiner*—Peter Zura
*Attorney, Agent, or Firm*—Oblon, Spivak, McClelland, Maier & Neustadt, P.C.

[57] ABSTRACT

The invention concerns a protective circuit for monitoring an object which can move between two end positions, for example a displaceable safety door (1) of an electric machine. This type of protective circuit has a very simple and distinct design and can consequently be produced economically. In particular, the monitoring system is designed so as to be independent of the start command. According to the invention, at least two end switches (4, 5) are provided for monitoring the end position of the object, at least one switch (18) is provided for activating a first reservoir for a first charge potential, and a multivibrator (8) is provided which is connected to a known driver bridge (9) which has relay outputs and is connected to a consumer, for example an electric machine. The multivibrator (8) is connected to a second reservoir for a second charge potential which keeps the multivibrator (8) activated for a predetermined period of time when the end switches (4, 5) are not in the "off" position.

13 Claims, 3 Drawing Sheets

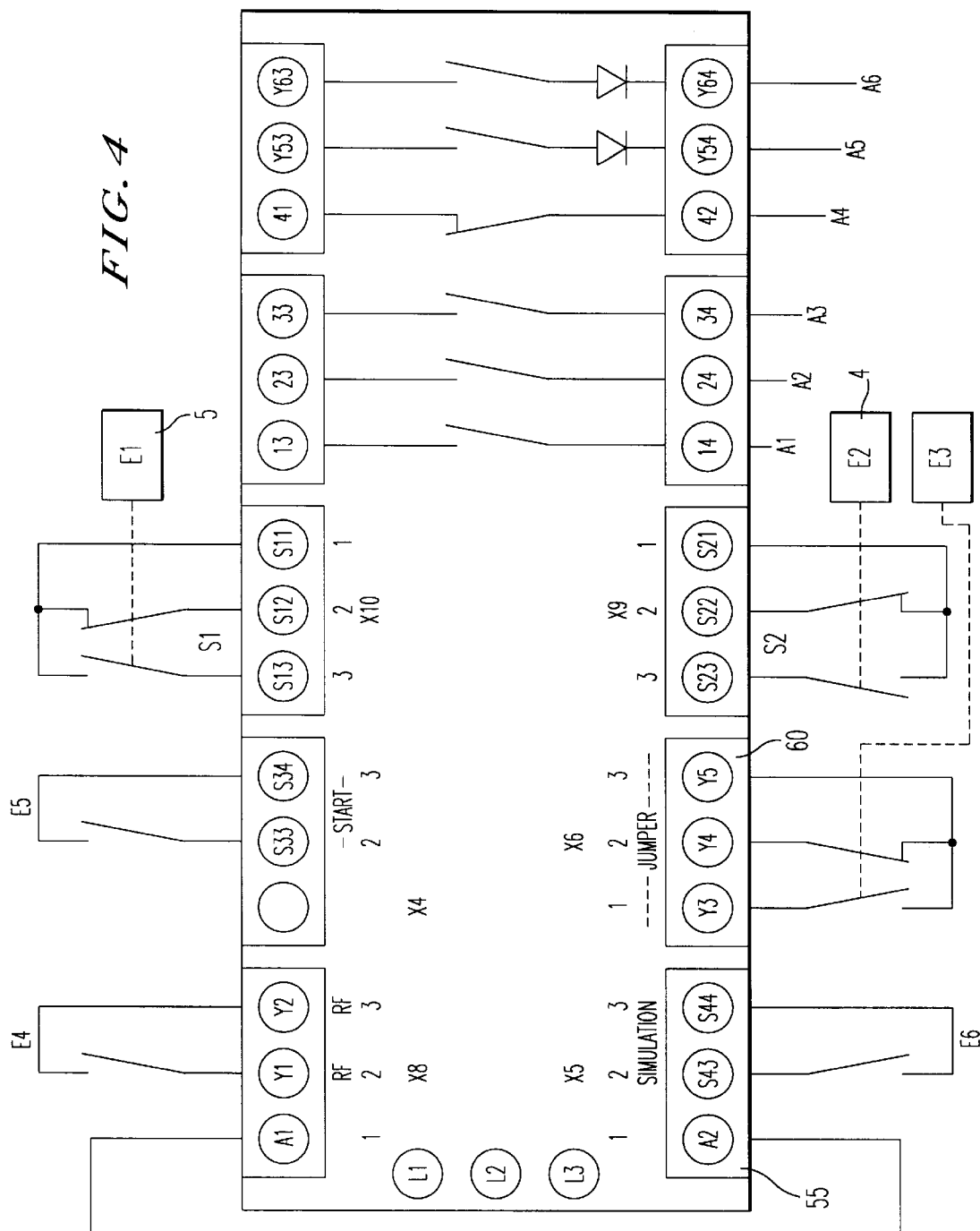

PROTECTIVE CIRCUIT

BACKGROUND OF THE INVENTION

1. Field of the Invention

This invention relates to a protective circuit for monitoring an object which can move between two end positions, for example a displaceable safety door of an electric machine.

2. Description of the Background

From experience and according to the state of the art, protective circuits of this type are well known. Here, protective circuits are provided to monitor the displacement of an object from a first end position to a second end position by means of end switch activation. For example, this type of protective circuit monitors safety doors, safety grids, or the like, of electric machines such as presses, punching devices, milling machines, lathes and lifts. It has to be ensured that the aforementioned machines can only be operated after correct closing of the safety door or the like by means of appropriate switching devices, for example in order to avoid injury hazards for operators. Normally two-handed operation is required for switching the machine into the respective dangerous mode, which is supposed to ensure that both the operator's hands are busy and that it is impossible for example to reach into the dangerous area with one or the other hand. However, at the same time, it is to be made sure that the operator cannot enter the dangerous area with other parts of the body, like for instance his legs, or with his clothes. However, it is also possible that this type of machine is activated through one hand activation of a switch, particularly a push button, so that the operator's other hand might be able to reach into the dangerous area. For this reason, machines of this type have safety doors, safety grids, light curtains or the like, which only allow the machine to be operated when these components are either placed in the correct closed position (safety door or grid) or correctly switched on (light curtain). With such protective circuits, it is necessary that any manipulation of the object to be moved or the associated end switches and machine activating device be made impossible. Furthermore, it is desirable that the protective circuit works faultlessly so that only under these circumstances a connection with the consumer, i.e. switching on of the dangerous operating mode, is allowed, but that on the other hand, in case of kind of failure occurs inside the circuit, the connection is reliably avoided. Electric protective circuits known thus far either do not meet all safety criteria or they are so complicated and their construction so costly that they require very high expenditures and that the complexity of construction has in fact to be considered a safety hazard.

EP-A-105 054 presents a protective circuit for monitoring an object which can move between two end positions, for example a displaceable safety door of an electric machine with at least two end switches that monitor the end position of the object.

SUMMARY OF THE INVENTION

Starting from this state of the art, it is an object of the invention to provide a multi-purpose protective circuit for monitoring an object which can move between two end positions, which is of very simple and distinct design and which can consequently be produced economically, which also in particular cannot be manipulated, and the monitoring is designed so as to be independent of the start command.

To achieve this object, a protective circuit with the characteristics of claim 1 is proposed.

Consequently, the protective circuit mainly consists of at least two end switches monitoring the end positions of an object, at least one switch for activating a first reservoir for a first charge potential and an oscillator, in particular a multivibrator is connected to a known driver bridge which is connected to a consumer, for example the electric machine, the oscillator being linked to a second reservoir for a second charge potential which keeps the oscillator active for a predetermined period of time as long as the end switches are undergoing a change of state.

For a protective circuit according to the invention it is therefore intended that the oscillator delivers signals to the driver bridge which under certain circumstances enable a connection with the consumer, i.e. the electric machine. For this purpose, the oscillator is connected to a reservoir for a charge potential which keeps the oscillator active if during a given period of time at least one of the two end switches is not in the position enabling the connection with the consumer. This active phase of the oscillator has a time limit so that if the period is exceeded, the oscillator is deactivated and no signal is transmitted to the driver bridge. Therefore, a connection with the consumer, which by the way also depends on another switching condition, cannot take place unless both end switches of the object, which can move between two end positions, reach the position enabling a connection with the consumer. In this case, a connection with the consumer is not possible even via the switch for activating a first reservoir for a first charge potential (start). This first charge potential is required as another signal for the driver bridge in order to establish the connection with the consumer by means of a circuit. Consequently, both the signals of the oscillator and the signals via the first charge potential must be transmitted to the driver bridge for the consumer, i.e. the machine, to be operated. In this respect, it is particularly important that only the signals of the oscillator have to be transmitted to the driver bridge within a time limit, i.e. that the object which can move between two end positions has to be transferred from its first unsafe position to its second safe position within a given period of time, so that both end switches are activated during this period of time and inform the oscillator that the object is in its safe position before the first charge potential is transmitted to the driver bridge without any time constraint so that a connection with the consumer is timewise independent from the start command. Consequently, a start command can also be transmitted belatedly to the driver bridge via the first reservoir for the first charge potential, provided that the oscillator is kept active during the given period of time and thereby the appropriate signals are transmitted to the driver bridge.

Other features and advantages of the protective circuit according to the invention are apparent from the dependent claims.

The protective circuit according to the invention is therefore provided with a time capacitor which is charged during a first phase and then delivers its charge if at least one end switch is activated. This charge is used for maintaining the active oscillator. If within the predetermined period of time, for instance within a synchronous period of time of 1.5 sec, the second switch is also activated so that the protective circuit can detect for example that the safety door is in the prescribed closed position, the oscillator no longer receives the charge potential required for keeping it active from the time capacitor but directly through the switching circuit which is cold switched when the first end switch is activated. If within the synchronous period of time, the second end switch is not activated as described above, the time capacitor discharges completely so that the oscillator and the discharge of the supply capacitor no longer receive any additional charge potential and the oscillator is deactivated so that no further signals are delivered to the driver bridge.

In case the oscillator, designed as a multivibrator, is connected to the voltage of the switching circuit within the synchronous period of time, i.e. that the second end switch is activated correctly, it is then possible and necessary via the switch for activation of the first reservoir for the first charge potential to send another signal to the driver bridge, which in conjunction with the signals from the multivibrator enables the connection with the consumer. In this respect, it may be necessary first to fulfil external start conditions. Preferably, the reservoir for the first charge potential consists of a start capacitor which is charged when the switch is activated and discharges towards the driver bridge when the switch is opened through at least one, preferably two, optocouplers designed as LEDs. In this case, both a monitored start through switch opening and closing and a non-monitored start only triggered through switch closure are possible.

BRIEF DESCRIPTIONS OF THE DRAWINGS

Further advantages and features of the invention will become apparent from the following description of the accompanying drawing where a preferred embodiment is represented, wherein FIG. 1 shows two end switches of a protective circuit in conjunction with a safety grid in closed state;

FIG. 4 shows a circuit diagram for connecting the end switches according to FIGS. 1 and 2;

FIG. 4 shows a circuit diagram for connecting the end switches according to FIG. 3.

DETAILED DESCRIPTION OF THE PREFERRED EMBODIMENTS

Figure 1:
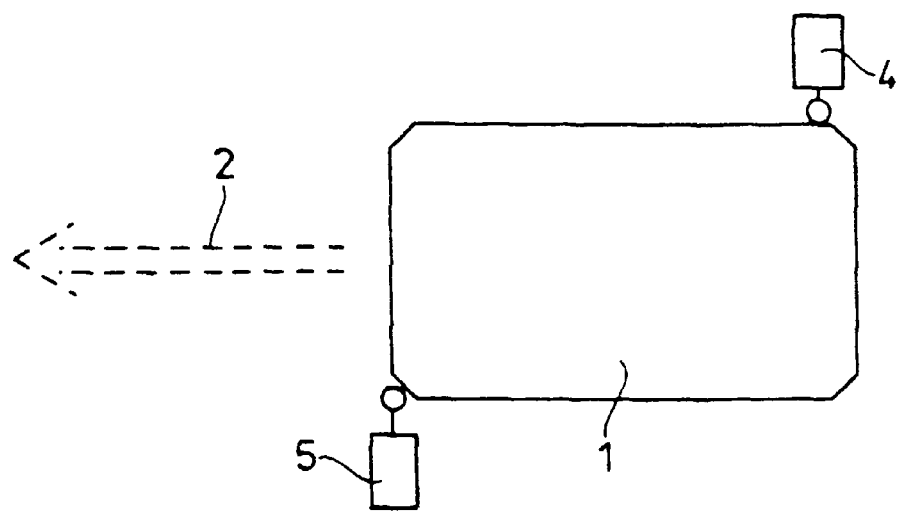
Figure 2:
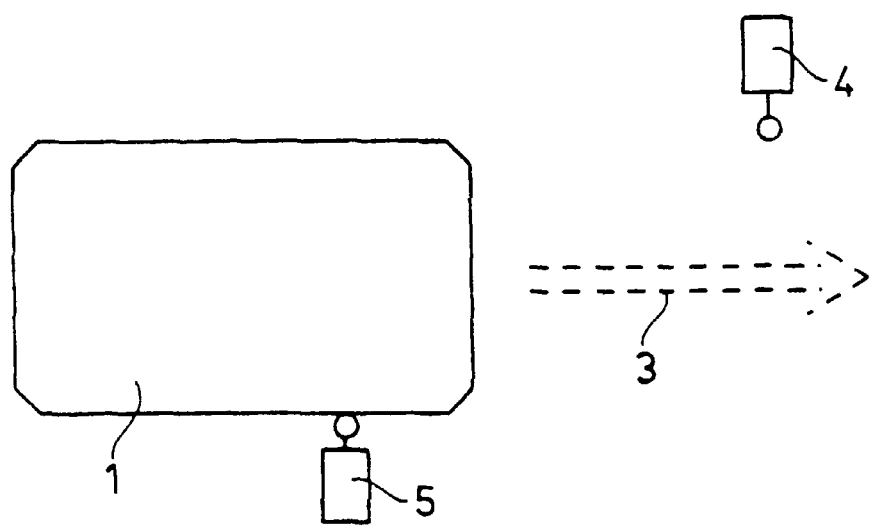
FIG. 2 shows the end switches according to FIG. 1 with the safety grid being open.

FIGS. 1 and 2 represent a safety grid 1 which is in closed position in FIG. 1 and in open position in FIG. 2, wherein the safety grid of FIG. 1 can be moved in the direction of arrow 2 to the open position of FIG. 2 and in the direction of arrow 3 of FIG. 2 to the closed position represented in FIG. 1. At opposite longitudinal edges of safety grid 1, two stationary end switches 4 and 5 are mounted, which are controlled mutually along the longitudinal edges of safety grid 1. In the closed position of safety grid 1 represented in FIG. 1, the end switch 4 is switched on and the end switch 5 is switched off. In FIG. 2, which shows the open position of safety grid 1, end switch 4 is switched off and end switch 5 is switched on.

Figure 3:
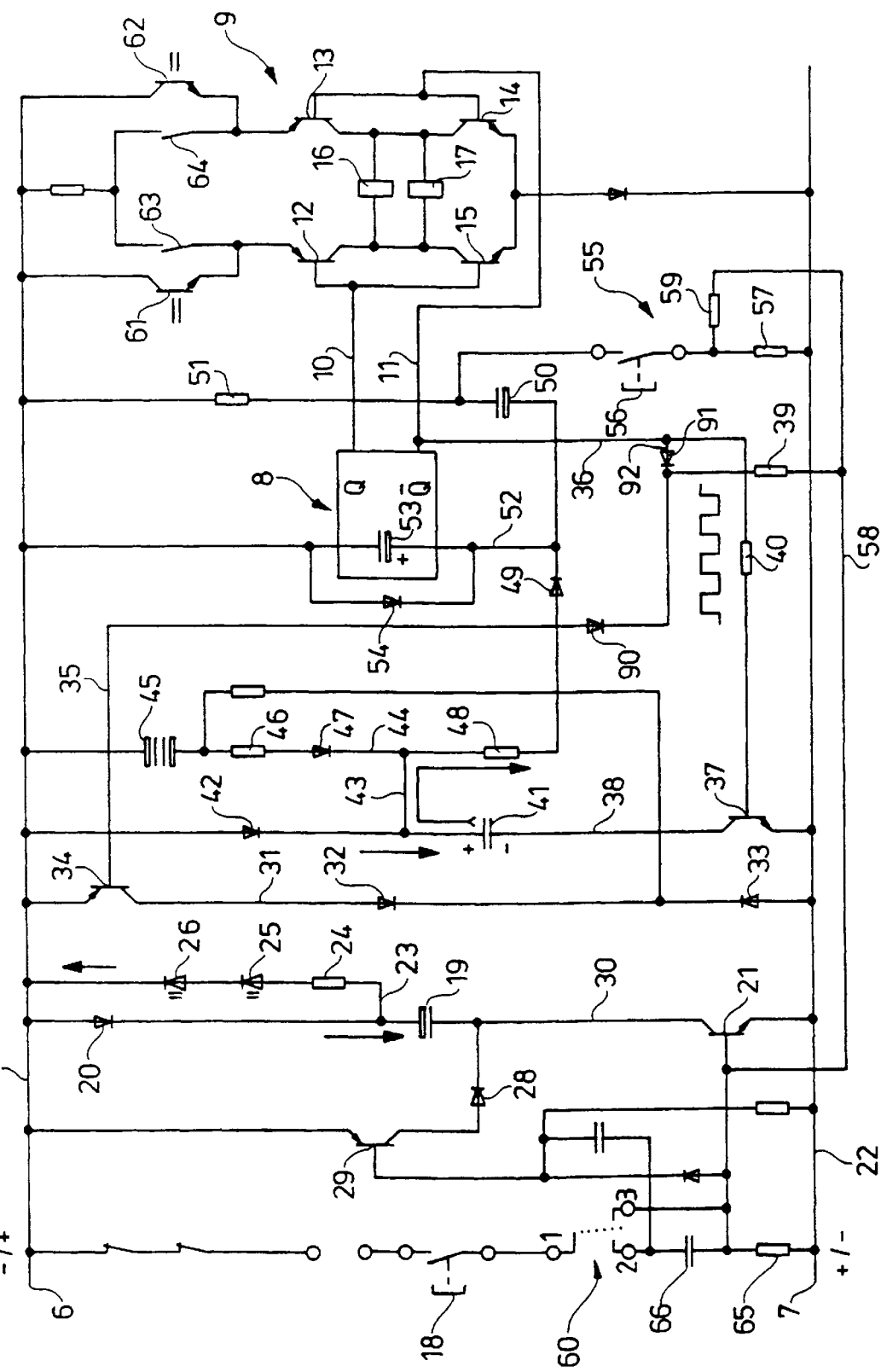
FIG. 3 shows a protective circuit in the form of a block diagram.

For monitoring these two end switches 4 and 5, a protective circuit is provided as represented in FIG. 3. This protective circuit should ensure that an electric consumer, namely an electric machine, as for example a press, punching device, milling machine, lathe or the like, can only be switched on if safety grid 1 has reached the closed position represented in FIG. 1, whereby the end switch 4 is switched on and the end switch 5 is switched off.

For this purpose, the end switch 4 is connected or designed with a switch 7 and the end switch 5 with a switch 6 controlling the power supply for the protective circuit shown in FIG. 3. This protective circuit has a known multivibrator 8 and a known driver bridge 9. The multivibrator 8 produces an output signal Q that is supplied through a lead 10 to driver bridge 9. Furthermore, the multivibrator 8 produces a signal $\overline{Q}$ that is supplied through a lead 11 to driver bridge 9. Driver bridge 9 has four transistors 12, 13, 14 and 15, a relay 16 or 17 being switched between transistors 14 and 15, respectively. The lead 10 is connected to the transistors 12 and 15 whereas the lead 11 links the multivibrator 8 to the transistors 13 and 14.

The multivibrator 8 produces two rectangular signals that are alternatively high or low triggering either relay 16 or relay 17.

Between switch 6 and switch 7, that are designed as push buttons, a start switch 18 is arranged which can directly activate driver bridge 9 if the multivibrator 8 delivers a signal Q or $\overline{Q}$ through the leads 10 or 11 and if the output polarity of driver bridge 9 corresponds to the closed safety grid 1. For this purpose, the protective circuit has a start capacitor 19 that is series-connected with a diode 20 and the output of which is linked to the collector of a transistor 21 whose transmitter is connected with a lead 22 adjacent to switch 7. The transistor 21 is designed as an NPN-transistor. In parallel with diode 20, in a lead 23, a resistor 24 as well as two optocouplers 25 and 26 are arranged and linked to a lead 27 communicating with switch 6. At the end opposite connector 27, lead 23 is connected between the diode 20 and the start capacitor 19. Furthermore, in parallel to the diode 28 and the start capacitor 19, another diode 28 and another transistor 29 are connected, the latter being designed as a PNP-transistor and connected on the transmitting side to lead 27 and on the collecting side to diode 28 with a lead 30 between the start capacitor 19 and the transistor 21.

In another lead 31 that is arranged in parallel with lead 30 between leads 22 and 27, two diodes 32 and 33 are series-connected, as well as a PNP-transistor 34 whose collector is linked to diode 32 and whose transmitter is linked to lead 27. The basis of the transistor 34 is linked through a lead 35 to a lead 36 that is connected on the one side to lead 11 of the multivibrator 8 and on the other side to the basis of a transistor 37 which is designed as an NPN-transistor and is connected on the transmitting side to lead 22 whereas the collector of the transistor 37 is connected through a lead 38 with the lead 27.

In the lead 35, a resistor 39 is series-connected with a diode 90. The lead 35 is connected on the one side to the basis of the transistor 34 and on the other side to a lead 58. Moreover, between lead 36 and lead 35, a lead 92 is arranged with another diode 91. The diode 91 is poled oppositely to the diode 90. Furthermore, in lead 36 also, a resistor 40 is arranged between the transistor 37 and the connection point of lead 35 to lead 36.

In the lead 38, on the collecting side of the transistor 37, a capacitor 41 as well as a diode 42 are series-connected, with a lead 43 being connected between the diode 42 and the positive plate of the capacitor 41, which links the lead 38 to the lead 44, in which a time capacitor 45, a resistor 46, a diode 47, a resistor 48, and another diode 49, a capacitor 50 as well as another resistor 51 are series-connected. The lead 43 is located between the diode 47 and the resistor 48 adjacent to lead 44. Between the diode 49 and the capacitor 50, and into lead 44, a lead 52 is connected linking the lead 44 with a capacitor 53 of the multivibrator 8 which is linked to the lead 27 via its negative plate. A diode 54 is connected in parallel with the capacitor 53.

Furthermore, the protective circuit has a simulation device 55 with a switch 56 for triggering the simulation device. The switch 56 is connected between the capacitor 50 and the resistor 51 to the lead 44 and the lead 22, with a resistor 57 being connected between the switch 56 and the lead 22. Moreover, between the switch 56 and the resistor 57, the lead 58 is connected with a resistor 59 linking the switch 56 to the base of the transistor 21.

In this protective circuit, the multivibrator 8 delivers signals to the driver bridge 9 that, under certain circumstances, enable a connection to the consumer, i.e. to the electric machine not described in more details. For this purpose, the multivibrator 8 is connected to a reservoir for a charge potential which keeps the multivibrator 8 active if within a given period of time at least one of the two end switches 4, 5 is not in the position enabling the connection to the consumer. This active phase of the multivibrator has a time limit so that if the period is exceeded, the multivibrator 8 is deactivated and no signal is transmitted to the driver bridge 9.

A connection to the consumer can only occur if the switch-on conditions are given, i.e. if the end switches 4 and 5 are in the appropriate positions. For this, the start switch 18, connected to a jumper 60, is pushed by means of which for example two switch-on conditions can be predetermined. For instance, if the start switch 18 remains switched on during a monitored start, the transistor 21 is opened and the transistor 29 is closed. This recharges the start capacitor 19 as long as the start switch 18 is switched on. If start switch 18 is then released, the transistor 21 is locked and the transistor 29 is opened so that the start capacitor 19 delivers its charge through the resistor 24 as well as through the optocouplers 25 and 26, with the start capacitor 19 discharging through the transistor 29 and the diode 6. The optocouplers 25 and 26 then deliver a signal and establish a connection for a limited period of time with the driver bridge 9 which is connected to the optocouplers 25 and 26 through the elements 61 and 62. In this case, the relays 16 and 17 pull up, with a potential drop occurring through the make-contacts 63 and 64 and the optocouplers 25 and 26 switching off. This mode of operation is effective if the jumper 60 has a connection between the represented positions 1 and 3, i.e. that jumper 60 is connected on the one side with the start switch 18 and on the other side through a resistor with the lead 22 as well as with the base of the transistor 21.

Whereas if the jumper 60 is in a position where the positions 1 and 2 are connected together so that the jumper 60 is connected on the one side with the start switch 18 and on the other side through a capacitor 66 and the resistor 65 with the lead 22 or with the base of the transistor 21, then the operating mode works like the operating mode mentioned above, but in this case, it is not a monitored start which means that the start is triggered by connecting the start switch 18. In this case, the charging of capacitor 19 is independent of the period of time during which the start switch 18 is being held down.

The operating mode described above of the protective circuit is effective if both end switches 4 and 5 are in a position where it can be detected that the safety grid 1 is closed. When the safety grid is moved from the open position shown in FIG. 2 to the closed position shown in FIG. 1, the switching circuit is cold switched until the safety grid 1 reaches its closed position. In this case, the multivibrator 8 is kept active through the charge of the capacitor 41 so that the multivibrator 8 can deliver signals to the driver bridge 9. If the end switch 4 is not activated within a given period of time, the multivibrator 8 is switched off as the charge of the capacitor 41 is used up. In case the end switch 4 is activated within the given period of time, the capacitor 41 is recharged, with the transistor 37 being opened and the transistor 34 being locked. Next, the transistor 37 is locked and the transistor 34 is opened so that the capacitor 41 can deliver its charge to the multivibrator 8 and the latter can transmit its signals to the driver bridge 9. Now, the multivibrator 8 is oscillating so that the command for connection to the consumer can be given through the start switch 18. For this purpose, the two start possibilities described above are provided, namely the monitored start or the non-monitored start. Finally, FIG. 4 also represents a circuit diagram for the connection of the end switches shown in FIGS. 1 and 2.

What is claimed is:

1. A protective circuit for monitoring an object which can move between two end positions by using at least two end switches that are used in monitoring the end positions of the object, the circuit comprising:

a switch for activating a first reservoir for a first charge potential;

a driver bridge having relay outputs that are connected to a consumer; and an oscillator connected to the driver bridge and a second reservoir for a second charge potential that keeps the oscillator active for a predetermined period of time when the end switches are in switched off position.

2. A protective circuit according to claim 1, wherein the second reservoir is a bipolar time capacitor.

3. A protective circuit according to claim 1, wherein the first reservoir has a start capacitor that can be recharged based upon whether the switch is on, the switch being a push button to deliver a signal to the driver bridge if the oscillator is activated and external switch-on conditions are given.

4. A protective circuit according to claim 3, further comprising:

an optocoupler being series-connected to the start capacitor and to an output side of the driver bridge to establish a connection having an appropriate polarity at least during a given period of time.

5. A protective circuit according to claim 3, comprising:

two transistors connected to a negative plate of the start capacitor and configured to switch alternatively so that charging and discharging of the start capacitor occur.

6. A protective circuit according to claim 3, wherein the push button is connected to the start capacitor and configured to recharge the start capacitor when the push button is in a closed position and to discharge the start capacitor when in an open position.

7. A protective circuit according to claim 3, further comprising:

a circuit comprising two polarization-free capacitors and one diode and configured automatically to charge and discharge the start capacitor.

8. A protective circuit according to claim 6 or claim 7, wherein the switch comprises:

a jumper switchably controlling the charging and discharging of the start capacitor based upon the position of the push button.

9. A protective circuit according to claim 1, comprising:

a charge reservoir connected to the oscillator and including at least one capacitor and at least two transistors connected to the at least one capacitor and controlled alternatively so that an alternate charging and discharging operation of the capacitor occurs, the capacitor delivering charge to the oscillator during the discharging operation.

10. A protective circuit according to claim 1, wherein the oscillator produces rectangular signals.

11. A protective circuit according to claim 1, further comprising:

a simulation device coupled to the oscillator to monitor at start-up the position of the object and to supply selectively a signal to the oscillator to indicate activation of the first reservoir by the switch.

12. A protective circuit according to claim 1, wherein the circuit is cold switched if only one end switch is activated.

13. A protective circuit according to claim 1, wherein the oscillator is configured in a closed loop.

* * * * *